United States Patent Office 2,858,201
Patented Oct. 28, 1958

2,858,201

ANTI-ICE CLOGGING ADDITIVE FOR FUEL

Stanley R. Newman, Fishkill, N. Y., assignor to The Texas Company, New York, N. Y., a corporation of Delaware No Drawing. Application January 28, 1955
Serial No. 484,832

4 Claims. (Cl. 52—.5)

This invention relates to an anti-clogging jet fuel composition. More particularly, it relates to a jet fuel additive used to prevent clogging of the filter and fuel lines of the jet engine system by ice or hydrocarbon hydrate crystal formation.

The present invention is related to my copending application, Serial No. 484,831, filed of even date wherein the excellent anti-icing action of polyalkylene glycol oleates in jet fuel is disclosed.

In the operation of jet planes at high altitudes, sub-freezing temperatures are frequently encountered. Such freezing temperatures range from 32° F. to as low as —80° F. Jet fuels are usually stored over water for various periods of time causing them to be saturated with said water at ground temperature. When the fuel is used in a jet plane which is operated at sub-freezing temperature attained at high altitude, the fuel becomes supersaturated with water. The water does not change to ice crystals at these freezing temperatures but instead, exists as minute droplets or particles of water suspended in the fuel.

It is thought that these water particles remain liquid at all operating temperatures of the jet planes unless said particles collide with some rough surface such as dust, pipe or tank walls, or filter pores where crystallization in the form of either ice or hydrocarbon hydrate crystals takes place. The phenomenon known as hydrocarbon hydration takes place at approximately —20° F. in jet fuels and apparently utilizes all available water particles created by the over-saturation of a jet fuel at low temperatures. Therefore, when the jet fuel stream contacts a nucleation site or rough spot at sub-freezing temperatures above approximately —20° F., ice crystals form, whereas when the fuel stream hits a nucleation site at temperatures under approximately —20° F., hydrocarbon hydrate crystals form at the point of contact. In either event, it was necessary to develop an answer to this particular problem so that the fuel line and filter would allow fuel to pass to the jet engine at any temperature to which the fuel was subjected while in flight.

My invention is directed to this end and consists principally of the addition of a polyoxyalkylene sorbitol hexalaurate in critical amounts to a liquid hydrocarbon fuel which is to be used at sub-freezing temperatures to render said fuel anti-clogging. I have found that by the addition of from not less than 0.01% and up to about 1% and preferably 0.1% by weight of a polyoxyalkylene sorbitol hexalaurate to the fuel, the tendency of the water particles, suspended in the fuel at sub-freezing temperatures, to form crystals at rough spots or nucleation sites in the fuel line or filter is eliminated. Further, I have found that this composition has little effect as an anti-clogging additive when used in amounts less than 0.01% by weight in fuels which have been stored over water causing water saturation of the fuel. Additive amounts over 1% by weight and up to the limit of solubility of the compound in the fuel may be used, although in general, there is little advantage to be gained from the use of amounts in excess of 1% by weight. Polyoxyalkylene sorbitol hexalaurates having a molecular weight range from 800 to 2000 are useful. Examples of such compounds are polyoxyethylene sorbitol hexalaurate having an average molecular weight of about 1600, polyoxypropylene sorbitol hexalaurate having an average molecular weight of about 1600 and polyoxybutylene sorbitol hexalaurate having an average molecular weight of about 1600. Of the specified compounds I prefer the polyoxyethylene sorbitol hexalaurate having an average molecular weight of about 1600 as an excellent anti-icing agent. The molecular weight range specified has been found to provide products having an adequate solubility in the fuel.

It is known to add certain specific amounts of a polyoxyethylene derivative of lauric acid partial esters of sorbitol to a fuel oil. This chemical compound was previously found to render fuel oil anti-clogging with respect to sludge caused by deterioration and/or the presence of foreign bodies in the fuel oil at normal temperatures. The amount in use was from no less than 0.0025% to no more than 0.005% by volume of the fuel composition. The percentage given is approximately the same when expressed either by volume or by weight and such concentrations are completely ineffective as ice anti-clogging agents in fuels at low temperatures. It is seen that the lowest amount of polyoxyalkylene sorbitol hexalaurate which I have found to be effective is about twice the highest amount of partial esters of sorbitol found to be effective for a different purpose in the composition of the prior art.

In evaluating the effectiveness of these compounds as anti-icing agents, the procedure was as follows: Samples of water-saturated jet fuel, prepared by shaking the fuel and water together in a sample can and allowing it to stand for a few days at room temperature were pumped through a standard low temperature filterability apparatus at the same specific constant volume and at —40° F. The pressure in the testing apparatus was allowed to increase until either a specified amount of fuel had been filtered and collected or the pressure in the apparatus increased because of crystallization on the filter to a standard measurement. The run was considered successful if the total volume collected reached 1000 ml. before the pressure had built up to 10 inches of mercury. The run ended when the pressure reached 10 inches or 1000 ml. of fuel were collected.

The above procedure was used for test runs using water-saturated fuels having no additives therein. Additive runs were made using the apparatus and procedure as described above except that a trap containing glass beads was installed just upstream of the filtering unit in order to produce a more extreme test. It was believed that at cold temperatures these glass beads would induce seeding of the water droplets present in the fuel thereby causing more consistent filter clogging.

The additive samples were prepared in two ways. One sample was prepared by mixing the selected additive with a water-saturated fuel prepared as stated above. This was termed a "water-saturated" blend. The other method of preparing an additive sample consisted of adding an additional amount of water to a "water-saturated" blend and shaking. This was termed an "excess water" blend.

The results of these tests are shown in the following tables wherein the figures expressed are representative of numerous runs conducted with the same additives. This data shows the effect of various additives on jet fuels as compared with the average result of 20 runs of an "excess water" blend fuel having no additives therein. These 20 runs with no additives averaged 282 ml. of fuel collected per run.

TABLE I

| Fuel plus 0.1 Weight Percent Additive | Milliliters Collected | |
| --- | --- | --- |
| | Water-saturated blends | Excess water blends |
| p-fluorotoluene | 754 | none |
| Morpholine laurate | 553 | 38 |
| Oleic acid | 593 | 132 |
| Polyethylene glycol monolaurate | 500 | 158 |
| Polyoxyethylene sorbitol hexalaurate | 1,000 | 628 |

The foregoing table shows that a polyoxyethylene sorbitol hexalaurate is totally effective when used in a fuel which is normally water saturated and still shows a marked ability to render the fuel anti-clogging when the added condition of "excess water" in the water-saturated fuel is imposed. This is significant in that the additive must not be leached out of the fuel by the presence of excess water in order to remain effective for any period of time.

It was realized that a valuable additive must also have the property of slowing up the process of formation of ice crystals on the filter; that is, the formation of ice should be slowed up after the pressure begins to increase because of the initial plugging of the filter pores.

In order to test this aspect of the anti-clogging additive, the amount of fuel collected at the beginning of the pressure increase, as shown on the meter of the filter-ability testing apparatus, was recorded along with the amount collected at the end of the run and the difference in each case was noted. The following tables show the results of test runs with no additive fuels and then with additive fuels though to have beneficial anti-clogging effects.

TABLE II

*No additive runs with water-saturated fuel*

| Run No. | Ml. | | |
| --- | --- | --- | --- |
| | At beginning of pressure increase | Collected | Difference |
| 1 | 14 | 28 | 14 |
| 2 | 133 | 166 | 33 |
| 3 | 37 | 66 | 29 |
| 4 | 74 | 105 | 31 |
| 5 | 58 | 75 | 17 |
| 6 | 54 | 71 | 17 |
| 7 | 62 | 82 | 20 |
| 8 | 184 | 209 | 25 |
| 9 | 115 | 143 | 28 |
| 10 | 54 | 67 | 13 |
| 11 | 336 | 372 | 36 |
| 12 | 62 | 81 | 19 |

TABLE III

*Additive runs with water-saturated fuel*

| Fuel plus 0.1% Additive | At beginning of pressure increase | Collected | Difference |
| --- | --- | --- | --- |
| Nitrobenzene | 76 | 113 | 37 |
| Methylethylketone | 398 | 487 | 89 |
| Trithiane | 46 | 51 | 5 |
| Polyethylene glycol monolaurate | 102 | 423 | 321 |
| Polyoxyethylene sorbitol hexalaurate | 170 | 1,000 | 830 |

It will be seen by an examination of Table II that the filtrate volume at which pressure begins to increase varies at random, but the volume of fuel that can be filtered after pressure has begun to increase until the end of the run, is fairly consistent. The average differences in volume at the end of the run from that measured at the beginning of the pressure increase for these no additive runs was 23.3 ml. and the average deviation between runs was ±10 ml. This tends to show that once crystallization starts, it proceeds at a definite rate.

Table III shows the difference between the volume at the end of the run and the volume collected at the beginning of the pressure increase for a number of water-saturated additive runs. It is seen that the effective additive starts to plug after a small volume of fuel has been filtered but that the crystallization process is slowed up so that the filter never becomes completely plugged. On the other hand, in fuels containing ineffective additives or no additives at all, there is a delay before pressure increase is begun, but once the pressure begins to increase there is rapid plugging of the filter until the pressure increase exceeds 10 inches of mercury.

The exceptional value of polyoxyethylene sorbitol hexalaurate as an anti-clogging agent has been substantiated by the foregoing data wherein this additive has shown superior qualities over those other substances tested therewith.

The fuels with which my invention is useful may be defined as liquid hydrocarbon fuels having a boiling point range of about 100° to 750° F. The particular fuel which was used to determine the effectiveness of these additives was one which met JP–3 specifications and which had an initial boiling point of 118° F. and an end boiling point of 491° F.

Although the invention has been described as applied to jet fuel, it is equally useful in increasing the anti-filter clogging properties of diesel fuels which are used in sub-freezing temperature, particularly in arctic region operations of diesel engines.

Obviously, many modifications and variations of the invention, as hereinbefore set forth, may be made without departing from the spirit and scope thereof, and, therefore, only such limitations should be imposed as are indicated in the appended claims.

I claim:

1. A liquid hydrocarbon fuel boiling within the range of from 100 to 750° F. having incorporated therein an amount in excess of 0.01% by weight but not in excess of the limit of solubility in the fuel of a polyoxyalkylene sorbitol hexalaurate having a molecular weight of from 800 to 2000 sufficient to prevent filter clogging by ice formation in the fuel when saturated with water at sub-freezing temperatures.

2. A liquid hydrocarbon fuel boiling within the range of from 100 to 750° F. having incorporated therein from 0.01 to 1% of a polyoxyethylene sorbitol hexalaurate having a molecular weight of from 800 to 2000.

3. A fuel as set forth in claim 2 having incorporated therein .1% of a polyoxyethylene sorbitol hexalaurate.

4. A jet fuel as set forth in claim 2 having incorporated therein .1% polyoxyethylene sorbitol hexalaurate having a molecular weight of about 1600.

References Cited in the file of this patent

UNITED STATES PATENTS 2,548,347    Caron et al.    Apr. 10, 1951

FOREIGN PATENTS 701,459    Great Britain    Dec. 23, 1953